United States Patent [19]

Hirano

[11] Patent Number: 4,665,450
[45] Date of Patent: May 12, 1987

[54] HELICAL SCAN TYPE MAGNETIC RECORDING AND/OR REPRODUCING APPARATUS

[75] Inventor: Shinji Hirano, Tokyo, Japan

[73] Assignee: Victor Company of Japan, Ltd., Kanagawa, Japan

[21] Appl. No.: 543,924

[22] Filed: Oct. 20, 1983

[30] Foreign Application Priority Data

Oct. 29, 1982 [JP]  Japan ................................ 57-190460
Oct. 29, 1982 [JP]  Japan ................................ 57-190461
Oct. 29, 1982 [JP]  Japan ................................ 57-190462
Oct. 29, 1982 [JP]  Japan ................................ 57-190463

[51] Int. Cl.[4] ............................................ G11B 5/027
[52] U.S. Cl. ........................................ 360/84; 360/85
[58] Field of Search ............................ 360/85, 95, 84

[56] References Cited

U.S. PATENT DOCUMENTS 4,445,154  4/1984  Kihara et al. ...................... 360/95
4,491,886  1/1985  Saito et al. ........................ 360/85

FOREIGN PATENT DOCUMENTS 350291    1/1974  Austria .
0068746   6/1982  European Pat. Off. .
0083932   1/1983  European Pat. Off. .
3018348   5/1980  Fed. Rep. of Germany .
3127592   7/1981  Fed. Rep. of Germany .
1366492   8/1970  United Kingdom .
1483129   8/1974  United Kingdom .
1579580   5/1976  United Kingdom .
2096817A  9/1982  United Kingdom ................ 360/95

Primary Examiner—A. J. Heinz
Assistant Examiner—Melissa J. Koval
Attorney, Agent, or Firm—Ladas & Parry

[57] ABSTRACT

A magnetic recording and/or reproducing apparatus comprises a guide drum having a plurality of video heads for recording and/or reproducing an information signal onto and/or from a magnetic tape which is spirally wrapped around the guide drum, and first through fourth guide members. The first guide member is arranged on a side of the guide drum where the tape begins to make contact with a peripheral surface of the guide drum in a traveling direction of the tape, and guides the tape which is perpendicular to a horizontal reference plane and which has a center line parallel to this reference plane toward the guide drum. The second guide member is arranged on a side of the guide drum where the tape terminates the contact with the guide drum, and guides the tape which separates from the guide drum. The first and second guide members are located at positions such that the tape is wrapped around the guide drum over an angular range which exceeds 180°. The third guide member is arranged downstream of the second guide member, and guides the tape which has been guided by the second guide member so as to change the traveling direction of the tape. The fourth guide member is arranged downstream of the third guide member, and guides the tape so that the tape becomes perpendicular to the reference plane and the center line of the tape becomes parallel to the reference plane.

11 Claims, 9 Drawing Figures

HELICAL SCAN TYPE MAGNETIC RECORDING AND/OR REPRODUCING APPARATUS

BACKGROUND OF THE INVENTION

The present invention generally relates to helical scan type magnetic recording and/or reproducing apparatuses, and more particularly to a magnetic recording and/or reproducing apparatus which can be downsized to a large extent.

Presently, there are several standardized systems for video tape recorders. The pattern of video tracks, an audio track, and a control track on a magnetic tape, the location of a control head, and the like are standardized in each of the standardized systems. On the other hand, there has been a recent development in downsizing the video tape recorder, by maintaining magnetic tape compatibility with the existing video tape recorder, that is, without changing the pattern of video tracks and the like on the magnetic tape.

As one method of downsizing the video tape recorder with the above described conditions still satisfied, there is a method of increasing the number of video heads, reducing the diameter of a tape guide drum, and increasing the angular range over which the magnetic tape is wrapped around the guide drum. For example, there was a method of providing four video heads at a 90° interval, reducing the diameter of the guide drum to ⅔ the diameter of the existing guide drum, and wrapping the magnetic tape around the guide drum over an angular range of approximately 270° instead of the angular range of approximately 180° which is employed in the existing video tape recorder. In this case, the four video heads were switched so as to operate with an interval of 270°. According to this method, the video tracks are formed on the magnetic tape with a pattern which is the same as the pattern which is in conformance with the existing standard, and the magnetic tape compatibility is maintained. Moreover, the video tape recorder can be downsized, because of the downsized guide drum.

As a method of wrapping the magnetic tape around the guide drum over the angular range of approximately 270°, one may consider employing the existing tape loading system for wrapping the magnetic tape around the guide drum over the angular range of approximately 180°. In this case, loading poles must travel over a greater distance in order to wrap the magnetic tape over the angular range of approximately 270°. In addition, the guide drum must be inclined by approximately 40° which is a large angle compared to the inclination of the existing guide drum. Furthermore, tape guide poles which are respectively located at positions where the magnetic tape begins to make contact with the guide drum and terminates the contact, must be inclined by an angle of 27° which is a large angle compared to the inclination of the guide poles in the existing tape loading system. Thus, it would be impractical to employ the existing tape loading system for the purpose of wrapping the magnetic tape around the guide drum over the angular range of approximately 270°.

The present inventor has devised various arrangements for the tape guide poles which wrap the magnetic tape around the guide drum over the angular range of approximately 270°, where the inclination of the guide drum is maintained the same as the inclination of the existing guide drum, by taking into consideration the possibility of realizing automatic tape loading operation with these arrangements. However, the number of guide poles which are arranged at the positions where the magnetic tape begins to make contact with the guide drum and terminates the contact, is generally large. Moreover, the guide poles are arranged quite separated from the guide drum. Therefore, although the guide drum itself could be downsized, the tape loading mechanism became complex because a large number of guide poles were arranged separated from the guide drum around the periphery of the guide drum. As a result, it was difficult to realize automatic loading of the magnetic tape. Further, there was a disadvantage in that the whole apparatus could not be downsized in accordance with the downsized guide drum

SUMMARY OF THE INVENTION

Accordingly, it is a general object of the present invention to provide a novel and useful magnetic recording and/or reproducing apparatus in which the above described disadvantages have been overcome Another and more specific object of the present invention is to provide a magnetic recording and/or reproducing apparatus which is designed so that a small number of tape guide members are arranged relatively close to a tape guide drum, a magnetic tape is wrapped around the tape guide drum over an angular range of approximately 270°, and the magnetic tape which terminates contact with the tape guide drum is loaded unto a tape travel path which is perpendicular to a reference plane and a center line of the tape travel path is parallel to the reference plane. According to the apparatus of the present invention, the apparatus can be downsized, and it is possible to carry out automatic loading of the magnetic tape.

Other objects and further features of the present invention will be apparent from the following detailed description when read in conjunction with the accompanying drawings.

DETAILED DESCRIPTION

Figure 1:
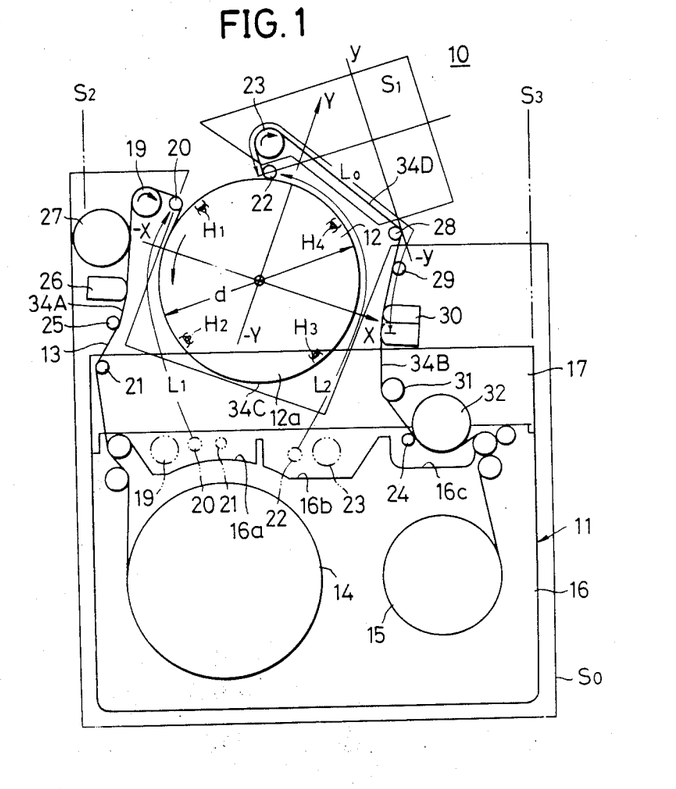
FIGS. 1 and 2 are a plan view and a side view, respectively showing an embodiment of a magnetic recording and/or reproducing apparatus according to the present invention in a recording or reproducing mode.
Figure 2:
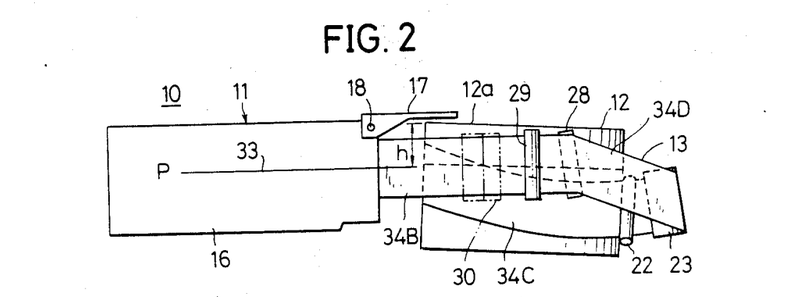

In a magnetic recording and/or reproducing apparatus 10 shown in FIGS. 1 and 2, a miniature type tape cassette 11 is loaded to a position close to a compact tape guide drum 12. As will be described later on in the specification, a group of tape guide poles are also arranged at locations close to the guide drum 12. Hence, the apparatus 10 is considerably downsized compared to the conventional apparatus.

The guide drum 12 comprises a rotary drum and a stationary drum which are provided concentrically. Four video heads $H_1$ through $H_4$ are provided on the rotary drum with a 90° interval. The diameter d of the guide drum 12 is equal to 41.3 mm, for example, which is ⅔ the diameter of the existing guide drum. The video heads $H_1$ through $H_4$ rotate counterclockwise at a rotational speed of 45 rps which is 3/2 the rotational speed in the existing system. The track widths of the video heads $H_1$ through $H_4$ respectively are the same, and for example, the track width is selected equal to the recording track pitch. In addition, the video heads $H_1$ and $H_3$ respectively have gaps of the same azimuth angle, and the video heads $H_2$ and $H_4$ respectively have gaps of the same azimuth angle. Further, the video heads $H_1$ and $H_2$ respectively have gaps of mutually different azimuth angles. A magnetic tape 13 is wrapped around the guide drum 12 over an angular range of 280° which exceeds the angular range of 180° employed in the existing system.

Figure 3:
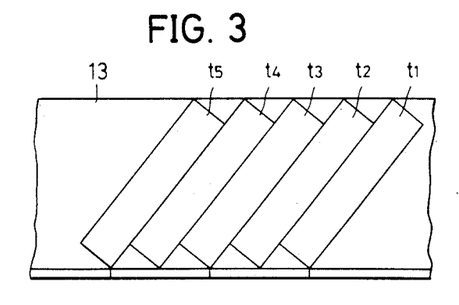
FIG. 3 shows a track pattern on a magnetic tape which is formed by the apparatus shown in FIG. 1.

A video signal is switched and supplied to a video head which leads the remaining three video heads with respect to the rotating direction of the video heads $H_1$ through $H_4$, every time the video heads $H_1$ through $H_4$ rotate by an angle of 270°. That is, each of the video heads $H_1$ through $H_4$ are successively switched to operate as it rotates while making contact with the tape 13 which is wrapped around the guide drum 12. Accordingly, video tracks $t_1$ ($t_5$) through $t_4$ are contiguously formed on the tape 13 as shown in FIG.3. The video track $t_1$ ($t_5$) is formed as the video head $H_1$ scans, the video track $t_2$ is formed as the video head $H_2$ scans, the video track $t_3$ is formed as the video head $H_3$ scans, and the video track $t_4$ is formed as the video head $H_4$ scans. The pattern of the video tracks shown in FIG. 3, is the same as the pattern of the video tracks in the existing system. The tape 13 which has been recorded with the video signal in the apparatus 10, can also be reproduced in the existing apparatus in a normal manner. In addition, the apparatus 10 can also reproduce the tape 13 which has been recorded with the video signal in the existing apparatus, in a normal manner. Thus, there is complete magnetic tape compatibility between the apparatus 10 and the existing apparatus.

The miniature type tape cassette 11 has an external form and size smaller than the standard type tape cassette. The tape cassette 11 comprises a cassette case 16 which has a supply reel 14 and a take-up reel 15, and a lid 17 provided at the front of the cassette case 16. The tape cassette 11 is loaded into the apparatus in a state where the lid 17 is open by being rotated about a pin 18 to a horizontal position. This tape cassette 11 is described in detail in a U.S. Pat. application Ser. No. 322,766 filed Nov. 19, 1981 entitled "MINIATURE TYPE TAPE CASSETTE".

As will be described later on in the specification, the guide drum 12 is mounted at a height position which is slightly lower than the height position of the existing guide drum. Hence, the open lid 17 of the loaded tape cassette 11 assumes a height position which is slightly higher than a top surface 12a of the guide drum 12. Thus, the loaded tape cassette 11 is positioned fairly close to the guide drum 12, in a state where the open lid 17 is separated from the top surface 12a of the guide drum 12, and a part of the lid 17 hangs over a portion of the top surface 12a in the plan view shown in FIG. 1. When the tape cassette 11 is loaded, a tape guide roller 19, a tape guide pole 20, a tension pole 21, a tape guide pole 22, a tape guide roller 23, a capstan 24, and the like, relatively enter within cutouts 16a, 16b, and 16c which are formed in the front of the cassette case 16. The tape cassette 11 is loaded into a horizontal position which is parallel to a reference plane $S_o$. This reference plane $S_o$ is an X-Y plane in an X-Y-Z coordinate which will be described later on in the specification, where Z=0. A plane (parallel to the reference plane $S_o$) which includes a center line of the tape 13 within the cassette case 16 in this loaded state, becomes a reference plane P with respect to the tape travel.

When a recording or reproducing operation is carried out, a tape loading mechanism (not shown) is operated, and the guide pole 20 and the guide roller 19 move along a locus $L_1$ in a horizontal plane. Moreover, the guide pole 22 and the guide roller 23 move along a locus $L_2$ while moving downwards at the same time. The guide poles 20 and 22 and the guide rollers 19 and 23 respectively move to final positions which are indicated by solid lines in FIG. 1. As a result, the tape 13 is drawn out of the cassette case 16 and loaded unto a predetermined tape path. That is, the tape 13 is drawn out from the supply reel 14, and makes contact with the the tension pole 21, a guide pole 25, a full-width erasing head 26, an impedance roller 27, and the guide roller 19. The traveling direction of the tape 13 is changed by approximately 90° at the guide roller 19. The tape 13 is spirally wrapped around the guide drum 12, and makes contact with the peripheral surface of the guide drum 12 over an angular range of approximately 280°, between the guide poles 20 and 22. As the tape 13 travels while making contact with the guide drum 12, one video head rotates by 270° and forms one track on the tape 13. The recording or reproduction of the video signal with respect to one track is carried out as one video head rotates by 270°.

The traveling direction of the tape 13 is changed by approximately 180° at the guide roller 23, and is directed towards the lower right in FIG. 1. The tape 13 is thereafter guided by a guide pole 28 and a vertical guide pole 29, and makes contact with an audio and control head 30. The tape 13 is further guided by a guide pole 31, and a combination of a pinch roller 32 and the capstan 24. The tape 13 then enters into the cassette case 16, and is finally taken up by the take-up reel 15.

The guide pole 20 which is located on the side where the tape 13 begins to make contact with the guide drum 12 with respect to the tape traveling direction, only moves to a position slightly exceeding the part of the guide drum 12 which extends most to the left in FIG. 1. On the other hand, the guide pole 22 which is located on the side where the tape 13 terminates contact with the guide drum 12, moves past a part of the guide drum 12 which extends most to the right by rotating along the guide drum 12 by approximately 90° from this part of the guide drum 12. That is, the guide pole 22 reaches a position at the rear of the guide drum 12. Accordingly, the tape 13 terminates contact with the guide drum 12 at the rear of the guide drum 12, in other words, at a position separated from the tape cassette 11. Hence, the length of tape in the tape path which extends from the position where the tape 13 terminates contact with the guide drum 12 to the position where the tape 13 is taken up by the take-up reel 15, can be set to a large value. A tape length $L_0$ in the simple tape path which extends from the position where the tape 13 terminates contact with the guide drum 12 to the position of the control head 30, can be set to a predetermined value (79.244 mm) without making the tape path unnecessarily complex so as to obtain this predetermined value. As a result, the compatibility of the tape 13 between the apparatus 10 and the existing apparatus is ensured, even with respect to the location of the control head 30.

Figure 4:
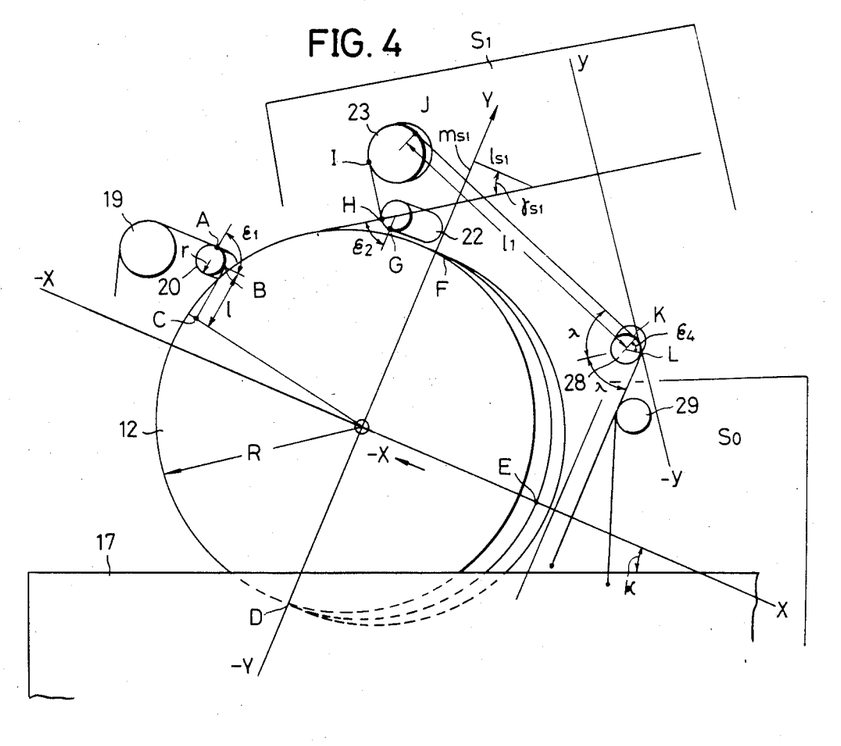
FIG. 4 is a plan view in an enlarged scale, showing a compact tape guide drum and a plurality of tape guide members arranged in the periphery of the compact tape guide drum in the apparatus shown in FIG. 1.
Figure 5:
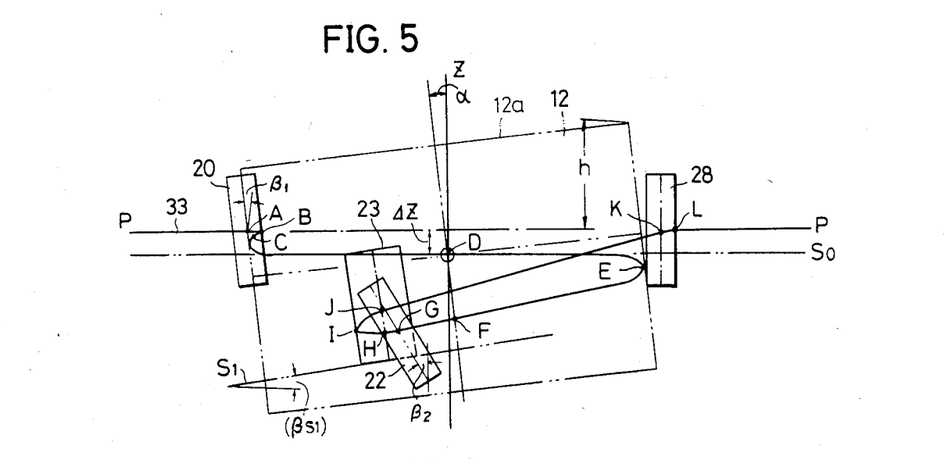
FIG. 5 is an elevation along a line Y—Y in FIG. 4 viewed from −Y towards Y.
Figure 6:
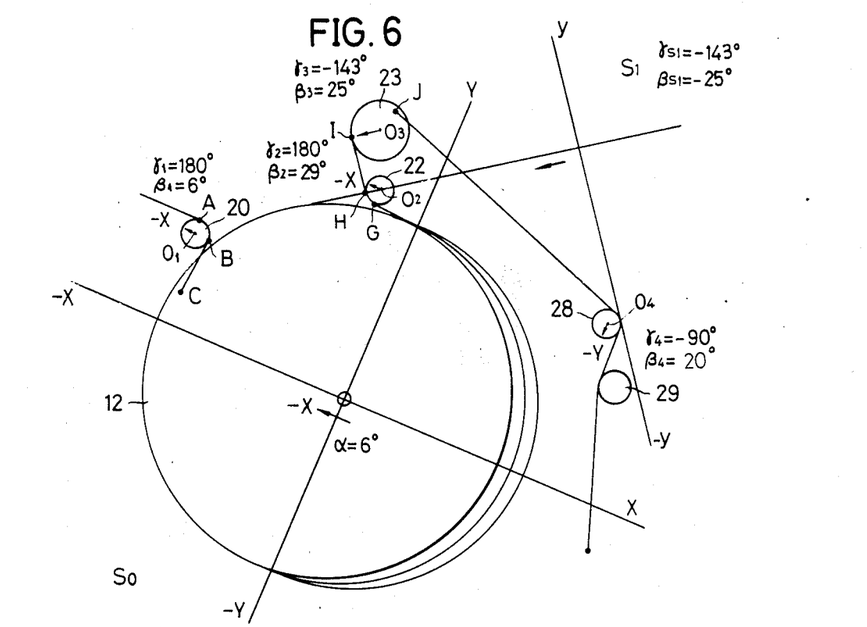
FIG. 6 is a plan view showing the location, sloping direction, and sloping angle of the plurality of tape guide members arranged in the periphery of the compact guide drum.

Next, description will be given with respect to the tape path in the periphery of the guide drum 12, by referring to FIGS. 4 and 5. FIG. 5 shows the locations and sloping states of the guide poles, viewed along a line Y—Y in FIG. 4. In FIG. 5, a line 33 indicates the center line of the tape 13.

In the tape path shown in FIG. 1, a tape path extending from the supply reel 14 to the guide pole 20 (first tape guide member) is shown as a tape path 34A. A tape path extending from the guide pole 28 (fourth tape guide member) to the take-up reel 15, is shown as a tape path 34B. In these tape paths 34A and 34B, the tape 13 travels in a state where the center line of the tape 13 lies on a plane P shown in FIG. 5 and is parallel to a reference plane $S_o$, and the tape 13 is perpendicular to this reference plane $S_o$. The center line of the tape 13 lies on the plane P within the tape cassette 11. A tape path around the periphery of the guide drum 12 between the guide pole 20 and the guide pole 22 (second tape guide member), in which the tape 13 makes contact with the guide drum 12, is shown as a tape path 34C in FIG. 1. This tape path 34C corresponds to a section between points A and G on the center line 33 shown in FIG. 5. The tape path 34C gradually slopes downwards from the plane P, toward the tape traveling direction. A tape path between the guide roller 23 (third tape guide member) and the guide pole 28 (fourth tape guide member), is shown as a tape path 34D in FIG. 1. This tape path corresponds to a section between points T and L on the center line 33 shown in FIG. 5. The tape path 34D slopes upwards in a substantially linear manner toward the tape traveling direction, so that the tape path is finally restored to the tape path in which the center line 33 of the tape 13 coincides with the plane P. The tape path 34D is parallel to a sloping plane $S_1$ which will be described later on in the specification.

In the tape path 34C around the periphery of the guide drum 12, the center line 33 of the tape 13 passes the point D which is a distance $\Delta Z$ lower than the plane P. The center line 33 of the tape 13 which is in the tape path 34C, intersects with the Y-Z plane at the point D. The tape 13 travels downwards in this tape path 34C, and the tape 13 makes contact with the guide drum 12 below the plane P. Thus, a distance h between the plane P and the top surface 12a of the guide drum 12, can be set to a small value compared to the corresponding distance in the existing apparatus. That is, the height position of the top surface 12a of the guide drum 12 is low with respect to the loaded tape cassette 11. As a result, the top surface 12a of the guide drum 12, is lower than the bottom surface of the open lid 17 of the loaded tape cassette 11. In this state, a part of the open lid 17 hangs over a part of the top surface 12a of the guide drum 12. Thus, the tape cassette 11 can be loaded to a position which is extremely close to the guide drum 12. Therefore, the height of the apparatus 10 as a whole can be made low, and this helps downsizing the apparatus 10.

The front surface of the tape cassette 11 is not parallel to the sloping direction X—X of the guide drum 12. In other words, the tape cassette 11 is loaded into a state intentionally inclined by an angle K (approximately 30°) to the X-axis. The guide drum 12, the tape guide system, stationary heads, and the like are all mounted between planes $S_3$ and $S_2$ which respectively extend from the right and left side surfaces of the tape cassette 11. By employing this arrangement, the apparatus 10 can be further downsized compared to the case where the tape cassette 11 is loaded into a state in parallel to the sloping direction of the guide drum 12.

The locations, sloping directions, sloping angles, and the like of each of the tape guide members which determine the tape paths around the periphery of the guide drum 12, are set as will be described later on in the specification so as to satisfy various conditions. The various conditions include conditions that the apparatus 10 can be downsized, automatic loading of the tape 13 is possible, the tension in the tape 13 in the width direction of the tape is uniform between adjacent tape guide members provided along the tape traveling direction, and the like. When setting the above tape paths, the tape path in which the tape 13 begins to make contact with the guide drum 12, is set substantially the same as the tape path in the existing apparatus in which the tape begins to make contact with the guide drum to be wrapped around the guide drum over the angular range of 180°. The sloping direction, the sloping angle, and the like of the guide pole 20 (first guide member), are set by employing the conventional designing method.

Next, description will be given with respect to the sloping direction, the sloping angle, the location, and the operation of each of the tape guide members, by referring to FIGS. 6 through 9.

The guide drum 12 is inclined by an angle $\alpha$ (approximately 6°) in the $-X$ direction with respect to the vertical axis Z. The guide roller 19 which is located on the upstream side of the guide drum 12 in the tape traveling direction, is provided vertical to the reference plane $S_o$. Thus, the guide roller 19 guides the tape 13 vertical to the reference plane $S_o$, so that the center line 33 of the tape 13 coincides with the plane P. The guide pole 20 (first guide member) guides the tape 13 so that the center line 33 of the tape 13 coincides with the plane P, and so that the tape 13 is directed toward the sloping peripheral surface of the guide drum 12.

The sloping angle and the like of the guide pole 20 are set according to the same method of setting the sloping angle and the like of the corresponding guide pole in the existing apparatus in which the tape is wrapped around the guide drum over the angular range of 180°. Concretely, the sloping angle $\beta_1$, the sloping direction $\gamma_1$, and the tape wrapping angle $\epsilon_1$ of the guide pole 20 are respectively obtained by the following equations.

$$\tan\beta_1 = \frac{1 - \sqrt{1 - (\cos\phi \cdot \sin\theta \cdot \sin\alpha + \sin\phi \cdot \cos\alpha)^2 - (\cos\theta \cdot \sin\alpha)^2}}{\cos\phi \cdot \sin\theta \cdot \sin\alpha + \sin\phi \cdot \cos\alpha}$$

$$\cos\epsilon_1 = 1 - \frac{\cos\phi \cdot \sin\theta \cdot \sin\alpha + \sin\phi \cdot \cos\alpha}{\sin\beta_1 \cdot \cos\beta_1}$$

$$\tan\gamma_1 = \frac{\cos\beta_1 \cdot \tan\theta \cdot \tan\epsilon_1 + \cos\alpha}{\cos\alpha \cdot \cos\beta_1 \cdot \tan\epsilon_1 - \tan\theta}$$

In the above equations, the sloping angle (still sloping angle) of the track on the stationary tape is represented by $\phi$, and the angle by which the tape wrapping angle exceeds 270° is represented by $\theta$. The sloping angle $\beta_1$ is the inclination of the guide pole 20 with respect to a line perpendicular to the reference plane $S_o$.

In the present embodiment, $\phi = 6°$, and $\theta = 10°$. If the values $\alpha = 6°$, $\phi = 6°$, and $\theta = 10°$ are substituted into the above equations, the calculated results lead to $\beta_1 = 6°$, $\epsilon_1 = 100°$, and $\gamma_1 = 180°$. In other words, the guide pole 20 is sloping in the 180° ($= \gamma_1$) direction, that is, in the $-X$ direction, by 6° ($= \beta_1$), and the tape 13 is wrapped around the guide pole 20 over an angular range of 100° ($= \epsilon_1$). The guide pole 20 directs the tape so that the center line 33 of the tape 13 becomes inclined by an angle with respect to the reference plane $S_o$, and for this reason, the guide pole 20 cannot assume a roller construction and is designed as a columnar member. A center $0_1$ of this guide pole 20 on the reference plane $S_o$, that is, on the X-Y plane where Z=0, is located in a coordinate (X:$-21.14$, Y:9.72). The direction cosine of the guide pole 20 is (X-component:0.10, Y-component:0.00, Z-component:$-0.99$).

The point A where the center line 33 of the tape 13 begins to make contact with the guide pole 20, the point B where the tape 13 terminates contact with the center line 33 of the tape 13, and the point C where the tape 13 begins to make contact with the guide drum 12 so as to become wrapped around the guide drum 12, are respectively set to the following (X, Y, Z) coordinates.

A = (X:$-21.40$, Y:11.22, Z:2.46)

B = (X:$-19.66$, Y:9.46, Z:2.34)

C = (X:$-20.63$, Y:3.58, Z:1.62)

In addition, the distance $\Delta Z$ by which the point D, where the center line 33 of the tape 13 intersects the Y-Z plane, is separated from the plane P, can be described by the following equation.

$$\Delta Z = K_R \cdot R + K_l \cdot l + K_r \cdot r$$

In the above equation, the following designations are used.

$K_R = \sin\alpha \cdot \cos\theta = (\pi/2 + \theta)\cos\alpha \, \tan\phi,$ $K_l = -\cos\alpha \cdot \sin\phi - \sin\alpha \cdot \cos\phi \cdot \sin\theta,$ $K_r = -\sin\beta_1 \, (\epsilon_1 \cdot \epsilon_1 - \sin\epsilon_1),$ R: radius of the guide drum 12 (20.67 mm), r: radius of the guide pole 20 (1.5 mm), and l : distance between the points B and C (6.00 mm).

If the above equation of $\Delta Z$ is calculated by substituting numerical examples, $\Delta Z$ becomes equal to $-2.5$ mm. This means that the center line 33 of the tape 13 is located below the plane P at the point D. Accordingly, the guide drum 12 is arranged at a low position such that the height position of the top surface 12a with respect to the plane P, is lower than the height position of the top surface of the guide drum in the existing apparatus with respect to the tape traveling plane within the tape cassette which is loaded in the apparatus. As a result, the tape cassette 11 is loaded to a position which is extremely close to the guide drum 12, in a state where a part of the open lid 17 of the tape cassette 11 hangs over a part of the top surface 12a as shown in FIG. 2. The point D is located at the coordinate (X:0.00, Y:$-20.65$, Z:0.00), on the reference plane $S_o$.

The sloping angle $\alpha$ and the distance $\Delta Z$ are in a relationship such that the distance $\Delta Z$ becomes small and the effect of reducing the height position of the guide drum decreases, when the value of the sloping angle $\alpha$ is increased.

Next, description will be given with respect to the sloping direction and the like of the guide pole 22, the guide roller 23, and the guide pole 28 which are provided on the side of the guide drum 12 where the magnetic tape 13 terminates contact with the guide drum 12.

First, description will be given with respect to the guide pole 22 (second tape guide member). Because the direction in which the tape 13 extends after terminating the contact with the guide drum 12 is set to the same direction as the X-axis, the sloping direction $\gamma_2$ of the guide pole 22 coincides with the $-X$ direction, that is, $\gamma_2 = 180°$. If it is assumed that the guide pole 22 is sloping in the $-X$ direction by the angle $\beta_2$ and that the tape 13 is wrapped around the guide pole 22 over the angle $\epsilon_2$, the sloping plane $S_1$ along the tape traveling path in which the tape 13 separates from the guide pole 22 and is directed toward the guide roller 23, is determined as follows.

That is, the direction cosine perpendicular to the sloping plane can be described by the following.

$$\begin{pmatrix} l_{S1}(X\text{-component}) \\ m_{S1}(Y\text{-component}) \\ n_{S1}(Z\text{-component}) \end{pmatrix} = \begin{pmatrix} \sin\beta_S \cdot \cos\epsilon_2 \cdot \cos\beta_2 - \cos\beta_S \cdot \sin\beta_2 \\ \sin\beta_S \cdot \sin\epsilon_2 \\ \sin\beta_S \cdot \cos\epsilon_2 \cdot \sin\beta_2 + \cos\beta_S \cdot \cos\beta_2 \end{pmatrix}$$

The sloping direction $\gamma_{S1}$ of the sloping plane $S_1$ is described by $\tan\gamma_{S1} 32\ m_{S1}/l_{S1}$, and the sloping angle $\beta_{S1}$ of the sloping plane $S_1$ with respect to the reference plane $S_o$ is described by $\cos\beta_{S1} = n_{S1}$. The angle with which the tape 13 is directed toward the guide pole 22, is represented by $\beta_S$ which is equal to $\beta_2 - (\phi + \alpha)$. Concretely, the angle $\beta_S$ is approximately equal to 17°. When the calculation is carried out by substituting numerical examples into each of the variables in the above equation, the sloping direction ($\gamma_{S1}$) of the sloping plane $S_1$ becomes equal to $-142°49'$, and the sloping angle ($\beta_{S1}$) becomes equal to 24°46'. The line y—y is the intersection line between the reference plane $S_o$ and the sloping plane $S_l$.

Concretely, the center $0_2$ of the guide pole 22 on the reference plane $S_o$ is located at the coordinate (X:$-9.55$, Y:22.16), and the direction cosine of the guide pole 22 is (X-component:0.48, Y-component:0.00, Z-component:$-0.87$). The point F where the center line 33 of the tape 13 terminates the contact with the guide drum 12, the point G where the center line 33 of the tape 13 begins to make contact with the guide pole 22, and the point H where the center line 33 of the tape 13 terminates the contact with the guide pole 22, are respectively described by the following (X, Y, Z) coordinates.

F = (X:0.69, Y:20.66, Z:$-6.71$)

G = (X:$-5.17$, Y:20.66, Z:-7.94)

H = (X:$-6.54$, Y:21.41, Z:$-8.15$)

The guide roller 23 (third tape guide member) is arranged vertical to the sloping surface $S_1$. The axis of the guide roller 23 is perpendicular to the center line 33 of the tape 13 which makes contact with and then terminates contact with this guide roller 23. The guide roller 23 is designed to rotate in the direction of the arrow shown in FIG. 1. Accordingly, there is substantially no increase in the tension in the tape 13 as the tape 13 passes the guide roller 23, even if the tape 13 is wrapped around the guide roller 23 over a large angle. In other words, the guide roller 23 changes the tape traveling direction by approximately 180°, without increasing the load acting on the tape 13 as the tape 13 travels. In addition, this guide roller 23 is located at a position which is relatively close to the guide drum 12. The guide pole 22 described before acts on the tape 13, so that the tape 13 which terminates the contact with the guide drum 12 is directed toward the guide roller 23 to make contact with the guide roller 23 in a state where the center line 33 of the tape 13 is perpendicular to the axis of the guide roller 23.

Concretely, the center $O_3$ of the guide roller 23 on the reference plane $S_o$, is located in a coordinate (X:−10.10, Y:26.00), and the direction cosine of the guide roller 23 is (X−component:0.33, Y−component:0.25, Z−component:−0.90). That is, the sloping direction $\gamma_3$ of the guide roller 23 is equal to −143°, and the sloping angle $\beta_3$ of the guide roller 23 with respect to the reference plane $S_o$ is equal to 25°. The sloping angle $\beta_3$ is the inclination of the guide roller 23 with respect to a line perpendicular to the reference plane $S_o$. Further, the point I where the center line 33 of the magnetic tape 13 begins to make contact with the guide roller 23, and the point J where the center line 33 of the tape 13 terminates the contact with the guide roller 23, can be described by the following (X, Y, Z) coordinates.

I =(X:−9.90, Y:26.38, Z:−8.00)

J =(X:−6.99, Y:30.64, Z:−5.74)

In other words, the center line 33 of the part of the tape 13 which is wrapped around the guide roller 23, is located at a relatively low position with respect to the reference plane $S_o$.

The guide pole 28 (fourth tape guide member) changes the traveling path of the tape 13 which terminates the contact with the guide roller 23 and moves in parallel to the sloping plane $S_1$, to a traveling path which is parallel to the horizontal reference plane $S_o$. In the present embodiment of the invention, because the direction toward which the tape 13 travels after terminating the contact with the guide pole 28 is set to coincide with the −Y direction, the sloping direction $\gamma_4$ of the guide pole 28 coincides with the −Y direction, that is, $\gamma_4$ becomes equal to −90°. The sloping angle of the guide pole 28 is represented by $\beta_4$. The sloping angle $\beta_4$ is the inclination of the guide pole 28 with respect to a line perpendicular to the reference plane $S_o$. An angle $\lambda$ shown in FIG.4 which is formed between the center line 33 of the tape 13 and the line Y—Y, is equal to $(90° - \gamma_{S1}) = 52°49'$.

Figure 7:
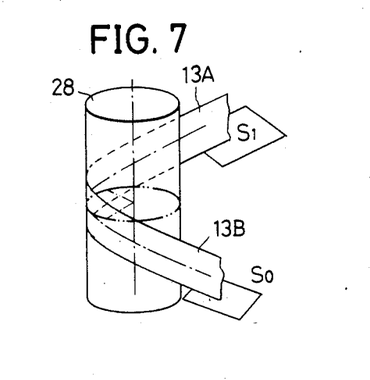
FIG. 7 is a diagram for explaining the tape guiding operation of the tape guide members shown in FIG. 4.

As shown in FIG.7, the guide pole 28 acts on the tape 13 so that a tape portion 13A which is perpendicular to the sloping plane $S_1$ is changed to a tape portion 13B which is perpendicular to the reference plane $S_o$. The relationships which stand in the periphery of the guide pole 28, are shown geometrically in FIGS. 8 and 9.

Figure 8:
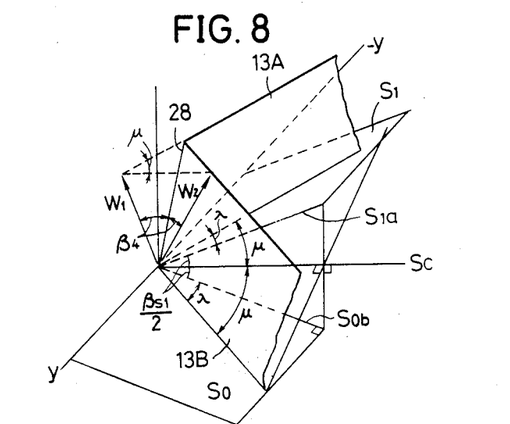
FIG. 8 is a diagram for geometrically explaining the tape guiding state due to the tape guide members shown in FIG. 7.

In FIG. 8, a line $S_c$ is a bisector of an angle formed between a line $S_{1a}$ on the sloping plane $S_1$ and a line $S_{oa}$ on the reference plane $S_o$. The angle formed between the line $S_{1a}$ and the bisector $S_c$, and the angle formed between the line $S_{oa}$ and the bisector $S_c$, respectively are $\beta_{S1}/2$. In addition, the tape portions 13A and 13B are symmetrical to a vertical plane which passes through the bisector $S_c$. Thus, the angles $\lambda$ and $\mu$ respectively are the same with respect to the tape portions 13A and 13B, as shown in FIG. 8. A line $W_1$ passes through the intersection between the planes $S_o$ and $S_1$, and is vertical to the sloping plane $S_1$. The length of the line $W_1$ corresponds to the width of the tape 13 in the tape portion 13A. A line $W_2$ also passes through the intersection between the planes $S_o$ and $S_1$, and is vertical to the reference plane $S_o$. The length of the line $W_2$ corresponds to the width of the tape 13 in the tape portion 13B.

Figure 9:
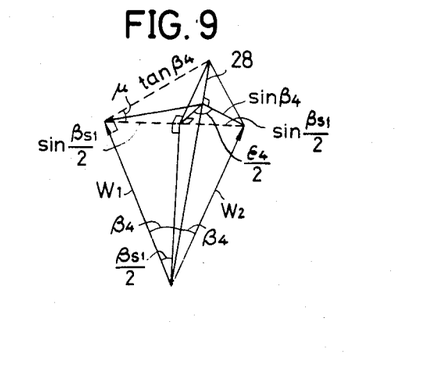
FIG. 9 is a diagram showing a part of FIG. 8 in an enlarged scale.

FIG. 9 shows an exetension plane of the tape portion 13A, a plane which includes the bisector $S_c$ and is vertical to the reference plane $S_o$, and a part of the tape portion 13B, in an enlarged scale.

The following equation (1) can be formed by analyzing FIG. 8.

$$\cos\mu = \cos\lambda \cdot \cos(\beta_{S1}/2) \tag{1}$$

On the other hand, the following equation (2) can be formed by analyzing FIG. 9.

$$\cos\mu = (\sin(\beta_{S1}/2))/\tan\beta_4 \tag{2}$$

Thus, the following equation stands from equations (1) and (2).

$$\cos\lambda \cdot \cos(\beta_{S1}/2) = (\sin(\beta_{S1}/2)/\tan\beta_4$$

As a result, the sloping angle $\beta_4$ of the guide pole 28 with respect to the reference plane $S_o$ (or the sloping plane $S_1$), can be described in terms of the angle $\beta_{S1}$ (sloping angle of the plane $S_1$ with respect to the reference plane $S_o$) which is formed between the planes $S_o$ and $S_1$, and the angle $\lambda$ of incidence of the tape portion 13A (or 13B) with respect to the intersection line Y—Y between the planes $S_o$ and $S_1$. The following equation (3) hence stands with respect to the sloping angle $\beta_4$.

$$\tan\beta_4 = (\tan(\beta_{S1}/2))\cos\lambda \tag{3}$$

In addition, by analyzing FIG. 9, the angle $\epsilon_4$ over which the tape 13 i wrapped around the guide pole 28, can be described by the following equation (4).

$$\sin(\epsilon_4/2) = (\sin(\beta_{S1}/2)) \sin\beta_4 \tag{4}$$

If the values $\beta_{S1} = 24°46'$ and $\theta_4 = 52°49'$ are substituted into the equation (3), the sloping angle $\beta_4$ becomes equal to 19°57'. Moreover, from the equation (4), $\epsilon_4$ becomes equal to 78°.

The relationship between the guide pole 28 and the height position of the tape 13, is such that a length $l_1$ of the tape 13 between the point where the tape 13 terminates the contact with the guide roller 23 and the point where the tape 13 reaches the guide pole 28 changes, and the height position of the tape 13 change, when the location of the guide pole 28 is changed in the plane view. In the present embodiment of the invention, the guide pole 28 is arranged at a position which is relatively separated from the guide roller 23 and is relatively cloe to the guide drum 12, so that the tape 13 is guided in a state where the center line 33 of the tape 13 coincides with the plane p.

Concretely, the center $O_4$ of the guide pole 29 on the reference plane $S_o$ is located in a coordinate (X:21.79, Y:20.31), and the direction cosine of the guie pole 29 is (X—component:0.00 Y—component:0.34, Z—component:—0.93). In addition, the point K where the center line 33 of the tape 13 begins to make contact with the guide pole 29, and the point L where the center line 33 of the tape 13 terminates the contact with the guide pole 29, can respectively be described by the following (X, Y, Z) coordinates.

$K = (X:22.10, Y:21.04, Z:2.27)$ $L = (X:22.29, Y:19.41, Z:2.46)$

Further, the present invention is not limited to these embodiments, but various variations and modifications may be made without departing from the scope of the present invention.

What is claimed is:

1. A helical scan type magnetic recording and/or redproducing apparatus comprising: a tape guide drum having a plurality of video heads for recording and/or reproducing an information signal onto and/or from a magnetic tape, said magnetic tape being spirally wrapped around said tape guide drum and traveling along a tape traveling path which comprises an upstream tape path part extending to a first point where said magnetic tape begins to make contact with a peripheral surface of said tape guiding drum, a spiral tape path part extending from said first point to a second point where said magnetic tape terminates contact with the peripheral surface of said tape guide drum, and a downstream tape path part extending from said second point, said tape guide drum having a rotary axis which inclines generally toward said first point;

a first tape guide member arranged on said upstream tape path part for guiding said magnetic tape toward the peripheral surface of said tape guide drum, said magnetic tape having a center line parallel to a horizontal reference plane and a surface of the magnetic tape being perpendicular to the horizontal reference plane immediately upstream of said first tape guide member, said first tape guide member having a first axis which is parallel to a plane which includes a first portion of the magnetic tape extending immediately upstream of said first tape guide member, said first axis being inclined with respect to a plane perpendicular to the traveling direction of said first portion of the magnetic tape;

a second tape guide member arrange on said downstream tape path part for guiding said magnetic tape which separates from said tape guide drum, said second tape guide member having a second axis which is parallel to a plane which includes a second portion of the magnetic tape extending immediately downstream of said second tape guide member, said second axis being inclined with respect to a plane perpendicular to the traveling direction of said second portion of the magnetic tape, said first and second tape guide members being arranged so that the height of the center line of said magnetic tape gradually lowers between said first and second tape guide members and said spiral tape path part extends around the peripheral surface of said tape guide drum over an angular range which is substantially equal to or larger than 270°;

a third tape guide member arranged downstream of said second tape guide member in the traveling direction of said magnetic tape, for guiding said magnetic tape which has been guided by said second tape guide member so as to change the traveling direction of said magnetic tape, said third tape guide member having a third axis which is parallel to a plane which includes a third portion of the magnetic tape extending immediately upstream of said third tape guide member, said third axis being parallel to a plane which is perpendicular to the traveling direction of said third portion of the magnetic tape; and a fourth tape guide member arranged downstream of said third tape guide member in the traveling direction of said magnetic tape, for guiding said magnetic tape so that a surface of said magnetic tape becomes perpendicular to said horizontal reference plane immediately downstream of said fourth tape guide member and the center line of said magnetic tape becomes parallel to said horizontal reference plane immediately downstream of said fourth tape guide member, said fourth tape guide member having a fourth axis which is parallel to a plane which includes a fourth portion of the magnetic tape extending in an immediate upstream of said fourth tape guide member, said fourth axis being inclined with respect to a plane perpendicular to the traveling direction of said fourth portion of the magnetic tape.

2. An apparatus as claimed in claim 1 in which said first, second, third, and fourth tape guide members are respectively located close to the peripheral surface of said tape guide drum.

3. An apparatus as claimed in claim 1 in which said second, third, and fourth tape guide members are respectively located at positions so as to form a tape path in which said magnetic tape is perpendicular to a sloping plane which is sloping with respect to said horizontal reference plane and the center line of said magnetic tape in said tape path is parallel to said sloping plane.

4. An apparatus as claimed in claim 3 in which said third tape guide member has a rotatable roller which rotates as said magnetic tape travels.

5. An apparatus as claimed in claim 3 in which said fourth tape guide member is inclined at a sloping angle $\beta_4$ with respect to a line which is perpendicular to said horizontal reference plane, said sloping angle being described by an equation, $$\tan\beta_4 = (\tan(\beta_{S1}/2))/\cos\lambda$$

where $\beta_{S1}$ is an intersecting angle of said horizontal reference plane and said sloping plane, and $\lambda$ is an angle of incidence of said magnetic tape with respect to an intersection line between said horizontal reference plane and said sloping plane.

6. An apparatus as claimed in claim 3 in which said magnetic tape is wrapped around said fourth tape guide member over an angle $\epsilon_4$ which is described by an equation, $$\sin(\epsilon_4/2) = (\sin(\beta_{S1}/2))\sin\beta_4$$

where $\beta_{S1}$ is an intersecting angle of said horizontal reference plane and said sloping plane, $\beta_4$ is a sloping angle of said fourth tape guide member with respect to a line which is perpendicular to said horizontal reference plane.

7. An apparatus as claimed in claim 1 in which the center line of said magnetic tape in said spiral tape path assumes a height position lower than a reference tape height position, said reference tape height position is a height position of the center line of said magnetic tape which is in tape path parts which respectively extend from an upstream of said first tape guide member and extend from a downstream of said fourth tape guide member, said tape guide drum has a top surface which is at a height position which is lower than an open lid of a tape cassette which is loaded into said apparatus, and said lid of said tape cassette assuming a horizontal position in its open state.

8. An apparatus as claimed in claim 1 in which said first and second tape guide members are arranged so that, with respect to a front surface of a tape cassette which is loaded into said apparatus, said second tape guide member wraps said magnetic tape around said tape guide drum over an angular range greater than an angular range over which said first tape guide member wraps said magnetic tape around said tape guide drum.

9. An apparatus as claimed in claim 1 which, with respect to a front surface of a tape cassette which is loaded into said apparatus, said first tape guide member is located on a side of said tape guide drum, and said second tape guide member is located substantially at a rear of said tape guide drum.

10. An apparatus as claimed in claim 1 which further comprises a full-width erasing head and an audio and control head, in which apparatus a tape cassette is loaded into said apparatus to assume a position such that a front surface of the loaded tape cassette is inclined with respect to a sloping direction of said tape guide drum, and said tape guide drum, said first through fourth tape guide members, said full-width erasing head, and said audio and control head are respectively arranged between planes which are extensions of right and left side surfaces of the loaded tape cassette.

11. An apparatus as claimed in claim 1 which further comprises an audio and control head, in which apparatus said audio and control head is located at a position such that a tape path part extending from said second point said audio and control head has a predetermined length.

* * * * *